(12) United States Patent
Keen, Jr. et al.

(10) Patent No.: US 8,635,296 B2
(45) Date of Patent: Jan. 21, 2014

(54) SYSTEM AND METHOD FOR PROCESSING SECURITIES TRADING INSTRUCTIONS AND COMMUNICATING ORDER STATUS VIA A MESSAGING INTERFACE

(75) Inventors: Thomas R. Keen, Jr., Plainville, MA (US); Richard Shen, Westford, MA (US)

(73) Assignee: Pivot Inc., Cambridge, MA (US)

( * ) Notice: Subject to any disclaimer, the term of this patent is extended or adjusted under 35 U.S.C. 154(b) by 0 days.

(21) Appl. No.: 13/466,572

(22) Filed: May 8, 2012

(65) Prior Publication Data

US 2012/0246249 A1 Sep. 27, 2012

Related U.S. Application Data

(62) Division of application No. 11/192,905, filed on Jul. 29, 2005, now Pat. No. 8,176,127.

(60) Provisional application No. 60/592,664, filed on Jul. 30, 2004.

(51) Int. Cl.
*G06F 15/16* (2006.01)

(52) U.S. Cl.
USPC ............ 709/206; 709/205; 709/230; 709/246

(58) Field of Classification Search
USPC ................... 709/204–207, 217–219
See application file for complete search history.

(56) References Cited

U.S. PATENT DOCUMENTS

| | | | |
|---|---|---|---|
| 5,864,827 A | 1/1999 | Wilson | |
| 6,393,460 B1 | 5/2002 | Gruen et al. | |
| 6,430,602 B1 | 8/2002 | Kay et al. | |
| 6,601,044 B1 | 7/2003 | Wallman | |
| 6,629,082 B1 | 9/2003 | Hambrecht et al. | |
| 6,980,983 B2* | 12/2005 | Banerjee et al. | 1/1 |
| 7,487,112 B2 | 2/2009 | Barnes, Jr. | |
| 7,487,248 B2* | 2/2009 | Moran et al. | 709/227 |
| 7,548,848 B1 | 6/2009 | Deb et al. | |
| 8,176,127 B2 | 5/2012 | Keen, Jr. et al. | |
| 2001/0003177 A1 | 6/2001 | Schena et al. | |
| 2002/0007335 A1* | 1/2002 | Millard et al. | 705/37 |
| 2002/0010803 A1 | 1/2002 | Oberstein et al. | |
| 2002/0086706 A1* | 7/2002 | Chen et al. | 455/560 |

(Continued)

OTHER PUBLICATIONS

About Aegis Software Inc., [online], [retrieved on Jun. 7, 2006]. Retrieved from the Internet <URL:http://www.aegisoft.com/about.htm>.

(Continued)

*Primary Examiner* — David Lazaro
*Assistant Examiner* — Edward Kim
(74) *Attorney, Agent, or Firm* — Lempia Summerfield Katz LLC

(57) ABSTRACT

A system allowing traders, etc. to use instant messaging (IM) (or other non-FIX based) communications to input trading instructions directly into a broker's Order Management System (OMS) for managing/executing trades. Accordingly, trading instructions may be provided electronically directly from a buy-side trader, and directly to a sell-side broker's/brokerage's OMS, without the need for the sell-side broker to manually re-key the order into the sell-side firm's OMS. Further, trading instructions are provided in electronic format directly to the broker's OMS without the need for the buy-side trader to have an expensive FIX based OMS or associated FIX connection, which is also expensive, thereby allowing relatively smaller investment houses/buy-side organizations to enjoy the benefits of electronic delivery of trading instructions directly to brokers' OMS.

20 Claims, 11 Drawing Sheets

(56) References Cited

U.S. PATENT DOCUMENTS

| | | | |
|---|---|---|---|
| 2002/0138579 A1* | 9/2002 | Goldberg | 709/206 |
| 2003/0033302 A1* | 2/2003 | Banerjee et al. | 707/6 |
| 2003/0069836 A1* | 4/2003 | Penney et al. | 705/37 |
| 2003/0079024 A1 | 4/2003 | Hough et al. | |
| 2003/0167279 A1* | 9/2003 | Smiga et al. | 707/102 |
| 2003/0233420 A1 | 12/2003 | Stark et al. | |
| 2004/0068567 A1* | 4/2004 | Moran et al. | 709/227 |
| 2004/0078596 A1 | 4/2004 | Kent, Jr. et al. | |
| 2004/0168055 A1* | 8/2004 | Lord et al. | 713/156 |
| 2004/0215731 A1* | 10/2004 | Tzann-en Szeto | 709/207 |
| 2004/0260710 A1 | 12/2004 | Marston et al. | |
| 2005/0021445 A1* | 1/2005 | Caro | 705/37 |
| 2005/0021639 A1* | 1/2005 | Wang et al. | 709/204 |
| 2005/0084100 A1* | 4/2005 | Spies et al. | 380/30 |
| 2005/0160031 A1* | 7/2005 | Hendrickson | 705/37 |
| 2006/0026091 A1 | 2/2006 | Keen, Jr. et al. | |
| 2006/0041684 A1 | 2/2006 | Daniell et al. | |
| 2006/0080220 A1 | 4/2006 | Samuel et al. | |
| 2006/0095511 A1 | 5/2006 | Munarriz et al. | |
| 2006/0101329 A1 | 5/2006 | Han et al. | |
| 2006/0167994 A1 | 7/2006 | Chen et al. | |
| 2007/0043646 A1 | 2/2007 | Morris | |
| 2008/0250107 A1 | 10/2008 | Holzer et al. | |
| 2009/0254616 A1 | 10/2009 | Cheung et al. | |

OTHER PUBLICATIONS

About the SunGard FIX Engine, [online], [retrieved on Jun. 7, 2006]. Retrieved from the Internet <URL:http://www.sungard.com/products_and_services/sbi/fix_engine/information/fixdatasheet1.pd>.

Cameron FIX Highly Available. FIX-FIX Routing Hub, [online], [retrieved on Jun. 7, 2006]. Retrieved from the Internet <URL:http://www.cameronsystems.com/solutions/fixrouting.html>.

Century 24 Solutions. Applied Solutions in Finance. FIX and Century 24, [online], [retrieved on Jun. 27, 2006]. Retrieved from the Internet <URL:http://www.c24.biz/library_fix.htm>.

Corcella, K., Wall Street & Technology; Meat and Potatoes (or myth). (Order Management/Routing Software and Networks), vol. 12, No. 6, ISSN: 1060-989X, Oct. 15, 1994.

FIX Feature History, [online]. Retrieved from the Internet <URL:http://www.fixprotocol.org/documents/647/fix_history_20010221.ppt+FIX+history+.ppt&hl=en>.

Golden, K., Wall Street & Technology. Making FIX Stick. (Financial Information Exchange Protocol), (Oct. 1, 1995).

Handley, L., Trace Datawise Partnership with Apt and FIX Engine Integration Extends use of MPF to Front Office. (Oct. 31, 2002), [online], [retrieved on Jun. 7, 2006]. Retrieved from the Internet <URL:http://www.fixprotocol.org/discuss/read/ab0407e3>.

Hutcheon et al., FPL Founders, [online], [retrieved on Jun. 7, 2006]. Retrieved from the Internet <URL:http://www.fixglobal.com/back_issues/Q2/FPL/FPL%20Founders.pdf>.

IBSN: Solutions: FIX. Financial Information eXchange(FIX), [online], [retrieved on Jun. 7, 2006]. Retrieved from the Internet <URL:http://www.ibsncentral.com/soluFIX.htm>.

INFOR REACH—Electronic Trading Technology [online], [retrieved on Jun. 27, 2006]. Retrieved from the Internet <http://www.in4reach.com/aboutus.html>.

McGuire, C., Wall Street & Technology. The Waiting Game. (Company Business and Marketing), (Jun. 1, 1999).

Mizen, M., TowerGroup. Instant Messaging: Does Regulatory Categorization Create an Opportunity in the Transaction Process, 036:08S (Jul. 2003).

Schmerken, I., Wall Street & Technology. Superhighway #1 goes Live. (Merrin Financial Inc.'s InterMarket Trading Network), vol. 12, No. 1, (Jul. 1994).

TowerGroup Research—Search Results, [online], [retrieved on Jul. 29, 2005]. Retrieved from the Internet <URL:http://towergroup.com/research/content/search/search_Report_exhibit.jsp?simpleResearchformatId= . . . .

* cited by examiner

Enter Trade Details

Side: Buy ▶   Quantity: 100

Ticker: TST   Ticker/Company Lookup

Order Type: MKT ▶   Limit:

Notes: NOTE FIELD DISPLAYS HERE

Enter Trade   Cancel

SYSTEM AND METHOD FOR PROCESSING SECURITIES TRADING INSTRUCTIONS AND COMMUNICATING ORDER STATUS VIA A MESSAGING INTERFACE

CROSS-REFERENCE TO RELATED APPLICATIONS

This application is a divisional of co-pending U.S. patent application Ser. No. 11/192,905, filed Jul. 29, 2005, entitled "System and Method for Processing Securities Trading Instructions and Communicating Order Status Via a Messaging Interface," which claims the benefit of U.S. Provisional Patent Application No. 60/592,664, filed Jul. 30, 2004, each of which are hereby incorporated herein by reference in their entirety.

FIELD OF THE INVENTION

The present invention relates generally to markets for the exchange of securities, and more particularly to an automated system and method for receiving and processing securities trading instructions via a messaging, e.g. Instant Messaging (IM), interface and for providing feedback on order status.

DISCUSSION OF THE RELATED ART

In trading of equities, equity options, fixed income, energy, foreign currency derivatives, etc. collectively referred to herein as "securities," have been traded in this country since the late 1700s. Traditionally, such securities have been traded on floor-based exchanges, such as the New York Stock Exchange (NYSE) or the American Stock Exchange (AMEX). The predominant method of trading in these floor-based environments is known as the "open outcry" system, which involves oral communications between market professionals at a central location in open view of other market professionals. In this system, an order is typically relayed out to a trader standing in a "pit." The trader shouts out that he has received an order and waits until a broker shouts back contract terms, and a trading transaction then results. In an effort to preserve this antiquated system of floor-based trading, the implementation of computer-based technology in the exchanges has been slow. However, some trading processes have been automated or partially automated.

As an example of such automation, many brokers/market professionals, dealers, brokerage houses, etc. (collectively, "sell-side firms") now use an Order Management System (OMS) for sell-side securities trading. An exemplary network environment 10 illustrating an OMS 12 of a brokerage house 20 is shown in FIG. 1. Such an OMS 12 provides a graphical user interface (GUI) via which a market professional 11, 13 can execute trades in accordance with the trading instructions via the sell-side broker's computing device 14, 16, such as personal computer, workstation, etc. Such an OMS 12 provides electronic connectivity to the exchanges (not shown) and/or other brokers/brokerage houses (not shown) via a communications network 90 so that trading instructions are transmitted to computer systems of the exchanges, brokerages, other brokers, etc. for processing, such that securities trades may be executed in an electronic marketplace/environment. Orders are inputted into the sell-side firm's OMS via multiple methods. For example, a buy-side trader 41 can call his/her sell-side broker, requiring the sell-side broker to manually input the trading instructions into the broker's OMS. Further, a buy-side trader can also send an instant message (IM) to his/her sell-side broker, requiring the sell-side broker to manually input the trading instructions into the broker's OMS. The buy-side trader 31 may also have his/her own OMS 30, and if the buy-side and sell-side firm's OMSs are connected via a specially-configured network, the buy-side firm's OMS may be able to send the order to the sell-side firms' OMS. The data exchange between the two systems may use the industry standard FIX (Financial Information eXchange) protocol. As the sell-side broker executes the buy-side trader's instructions, the order's status is updated in the sell-side firms' OMS. A typical update includes information regarding the number of shares executed and the average price for these shares (in the case of an equity security order). If the buy- and sell-side firms' OMSs are connected via a network, the sell-side firm may send these order updates to the buy-side firm's OMS.

The OMS 12 may report execution of trading transactions via Notices of Execution, e.g. for display via a software based trade blotter. An exemplary web-based trade blotter 150 is shown in FIG. 6. Various commercially available services provide web or other software-based trade blotters identifying trading transactions and related trade details. One such web-based blotter service is provided by JNK Securities of New York, N.Y., USA. Various OMSs and related hardware and software, are commercially available and well known in the art, such as the MarketCenter system manufactured and/or distributed by Tradeware Systems, Inc of New York, N.Y., and the Brass system manufactured and/or distributed by SunGard Worldwide of Wayne, Pa.

Communications and/or instructions communicated to and/or from an OMS are typically formatted and/or communicated according to a standard protocol that is widely used in the field of financial services. The Financial Information eXchange (FIX) protocol is a nearly universal standard for exchange of such types of information in the securities field. Examples of alternative protocols include FIXML (FIX adapted to XML) and FPML. Accordingly, an OMS provides a useful measure of technology-based communication between the various brokers, between a broker and a brokerage, and between a brokerage and other brokerages, the exchanges, etc.

A few technologically sophisticated (usually, relatively large) buy-side traders, investment houses/firms, etc. (collectively, "buy-side trader") have their own OMS 30 permitting a buy-side trader/investment professional 31 to input trading instructions, and otherwise communicate directly, with a sell-side brokerage's OMS 12, as shown in FIG. 1. Such communications are made using the FIX protocol discussed above. Because such systems are expensive, relatively few buy-side traders 31, 41 or their firms have such OMS systems and/or the dedicated FIX connections required for their operation.

Accordingly, most sell-side brokers operating and/or interacting with an OMS service buy-side traders that do not have such OMSs, and thus such sell-side brokers still use inefficient techniques to obtain trading instructions from the buy-side traders. For example, an individual investor, an investment professional, or other buy-side trader 41 may place a telephone call to a sell-side broker 13 and provide oral trading instructions. Alternatively, though less frequently, the buy-side trader 41 may provide such trading instructions to the sell-side broker 13 by faxed or other written request, electronic mail (e-mail) message, etc. While this provides some efficiency in communicating with the individual sell-side broker 13, such communications are still ineffective for communicating directly with the sell-side broker's/brokerage's OMS 12. Accordingly, the sell-side broker 13 must type or otherwise manually provide input to his OMS to place the corresponding trade into the OMS for subsequent execution.

A recent development is the use of Instant Messaging (sometimes called IM or IMing) to communicate instructions to a trader. IM differs from ordinary e-mail in the immediacy of the message exchange and also makes a continued exchange simpler than sending e-mail back and forth. Most communications are text-only. To access an IM service, a user registers with a service provider and, after connecting to the Internet (or other appropriate data network), enters the user's screen name and password to log in to the IM network. Popular IM applications include AOL's Instant Messenger (AIM) and Microsoft's Network Messenger Services (MSN) and Yahoo's Yahoo! Messenger. Once a user has logged in to the appropriate IM network, his/her presence on the system is made known to all authorized partners (commonly termed "buddies"). The user can then engage in free-form, textual conversations with other IM users connected to the system.

Because IM is almost completely a text-based service, IM communication is generally not burdened by the need to transfer large graphic, sound, or program files. As a result, IM communications are truly "instantaneous" under most conditions. Even during peak Internet usage periods, the delay is rarely more than a couple of seconds. Accordingly, many buy-side traders, and sell-side brokers, have taken to the use of IM for communication purposes, so that the traders can quickly send, and brokers can quickly receive, trading instructions. Accordingly, such IM provides a useful measure of technology-based communication between the buy-side trader and the sell-side broker. However, such IM communications are separate, distinct, and incompatible with, any communications with/between OMS systems. Accordingly, a broker must be available to type or otherwise provide the trading instructions to the OMS, which introduces delays and opportunities for errors, and increases costs while decreasing efficiency.

SUMMARY OF THE INVENTION

The present invention provides a system that allows individuals/buy-side traders to use instant messaging (IM) (or other non-FIX based) communications to input trading instructions directly into a sell-side broker's Order Management System (OMS), so that the sell-side broker may then work to execute the trade using the broker's OMS. Accordingly, trading instructions are provided electronically directly from the buy-side trader, directly to the sell-side broker's/brokerage's OMS, without the need for a sell-side broker to manually re-key the order into the sell-side firm's OMS. This tends to lower the sell-side brokerage's costs of processing the trade, while reducing inefficiencies, delays, errors, etc. Additionally, it is welcomed by buy-side traders as more convenient, more accurate and faster than existing alternatives. Further, trading instructions are provided in electronic format directly to the sell-side broker's OMS without the need for the buy-side trader to have an expensive FIX based OMS or associated FIX connection, which is also expensive, thereby allowing relatively smaller investment houses/buy-side organizations to enjoy the benefits of electronic delivery of trading instructions directly to brokers' OMS.

BRIEF DESCRIPTION OF THE DRAWINGS

The present invention will now be described by way of example with reference to the following drawings in which:

FIG. 9 is an image of an exemplary IM client software window that is specially-configured for sending trading instructions in accordance with the present invention.

DETAILED DESCRIPTION

The present invention allows buy-side traders to use instant messaging (IM) communications to input trading instructions directly into a sell-side broker's Order Management System (OMS), so that the sell-side broker may then work to execute the trade using the OMS. Accordingly, trading instructions are provided electronically directly from the buy-side trader/individual, to the sell-side brokerage's OMS, without the need for a sell-side broker/individual to re-key the order. In embodiments in which the sell-side broker is actually an automated "bot", there is no need for human intervention in receiving the IM and processing it into the OMS, as discussed in greater detail below. Further, the present invention provides a system capable of allowing sell-side brokers to provide order status communications back to the buy-side trader without the costs or technological resources associated with having a buy-side OMS. Accordingly, after a broker establishes a "presence" on the IM networks, the present invention allows for the use of existing buddy relationships between a buy- and a sell-side user, but provides for enhanced functionality during the conversations, without the associated delays, inefficiencies, errors, etc.

Figure 1:
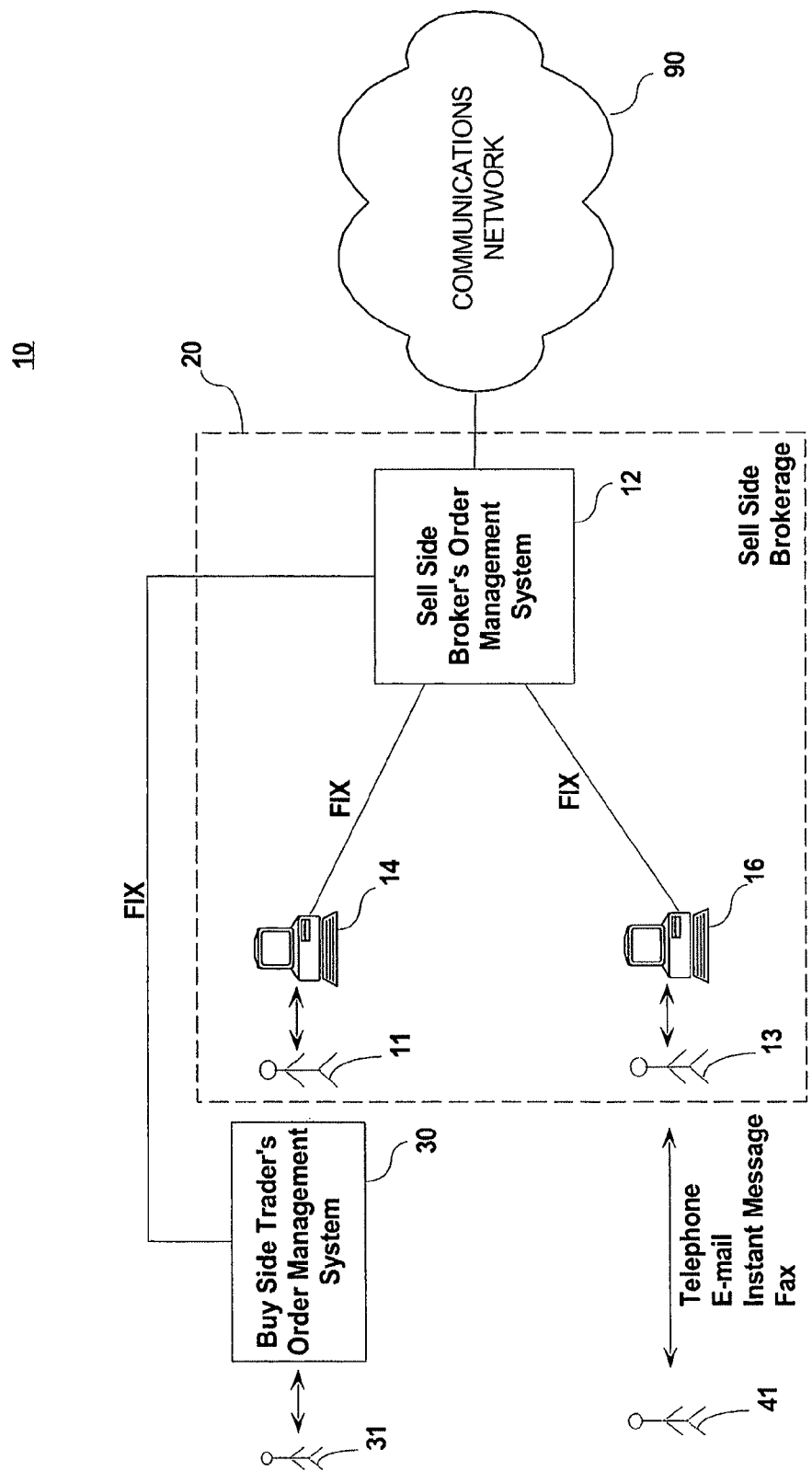
FIG. 1 is a diagram of an exemplary environment for processing of instructions for trading of securities that is representative of the prior art.
Figure 2:
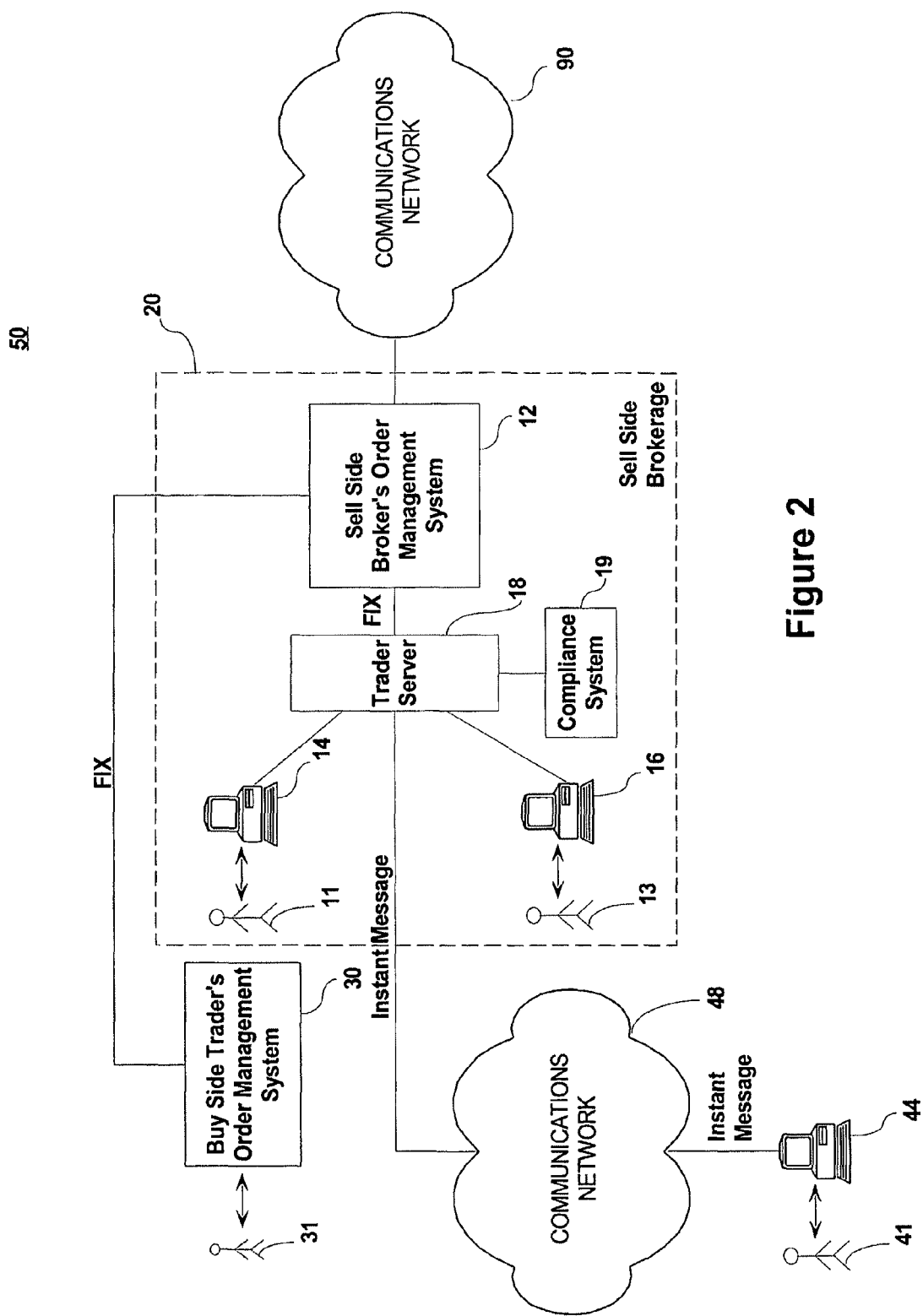
FIG. 2 is a diagram of an exemplary environment for processing of instructions for trading of securities that is in accordance with the present invention.

The present invention may be understood with reference to the exemplary, simplified network environment 50 of FIG. 2, which is similar to the network environment 10 of FIG. 1, but which is further configured in accordance with the present invention. Similar elements/components are marked with like reference numerals for ease of reference. Accordingly, it is appreciated that the sell-side brokerage's OMS 12 operates in a generally conventional fashion, and that a buy-side trader 31 may use his OMS 30 in a conventional manner to communicate with the sell-side brokerage's OMS 12. Further, sell-side brokers 11, 13 may continue to operate in a conventional manner, and may receive trading instructions via telephone, etc. and work trades within the OMS 12 in a conventional fashion.

However, in accordance with the present invention, a specially configured Trader Server 18 is provided within the brokerage's network 20. In certain embodiments the Trader Server 18 is provided physically outside, but in communication with, the broker's network. As shown in FIG. 2, the Trader Server 18 is logically positioned between the brokerage's OMS 12 and any buy-side traders 41, and/or their computing devices 44, wishing to communicate with the brokerage's OMS 12. Optionally, the Trader Server 18 may be logically positioned between the brokerage's OMS 12 and the brokerage's sell-side brokers 11, 13, and/or their computing devices 14, 16.

Accordingly, as shown in FIG. 2, the Trader Server 18 can communicate with one or more client devices 44 via a communications network 48. By way of example, the communications network 48 could be a local area network (LAN), wide area network (WAN), an intranet, the Internet, etc. Any network configuration allowing data to flow between points of access may be used. In this example, the communications network 48 is the Internet, and the Trader Server 18 is a specially configured server, as discussed below. Accordingly, the Trader Server 18 and any client devices 44, etc. can communicate with each other via a common protocol, such as a public IM protocol, such as that used by AOL Instant Messenger (AIM®) or a common proprietary protocol, such as that used by IMTrader™ of Pivot Solutions, Inc. of Boston, Mass., the assignee hereof. It will be understood by those skilled in the art that an actual network topology may include numerous clients and/or servers. The Trader Server 18 is discussed in greater detail below with reference to FIG. 5.

Additionally, the Trader Server 18 is optionally configured to communicate with the brokerage's existing compliance system 19. By way of example, such compliance systems 19 record communications between buy-side traders and sell-side brokers, among sell-side brokers, etc., as generally required by SEC Regulation 17a-4. For example, IM Manager software manufactured/distributed by IMLogic of Waltham, Mass., USA is a commercially available software package that may be used to implement a suitable compliance system. As well known in the art, such compliance systems may be configured in a straightforward manner to keep records of IM communications for such purposes.

The buy-side trader 41 may therefore use his client device 44, such as a personal computer, PDA, internet-enabled mobile phone or the like to communicate instant messages via a public or private IM network, to a sell-side trader 11, 13, or bot, and thus indirectly to and/or through the Trader Server 18. IM communications made via the network 48 for this purpose are preferably encrypted using 128-bit SSL encryption, or otherwise secured, due to the sensitive financial nature of such communications.

In one embodiment, the client device 44 is configured with standard, commercially available IM client software, such as the AOL Instant Messenger (AIM®) software manufactured and/or distributed by America Online, Inc., a division of Time Warner, Inc. of New York, N.Y., USA, for sending and receiving instant messages. In such an embodiment, generally available, generally accessible public IM networks, and public IM software, may be used in accordance with the present invention. Alternatively, the present invention may be configured to interface with a private IM network. To establish the IM functionality, an account with an IM service provider, the required hardware, software and operating system, and a network connection is needed.

Figure 7:
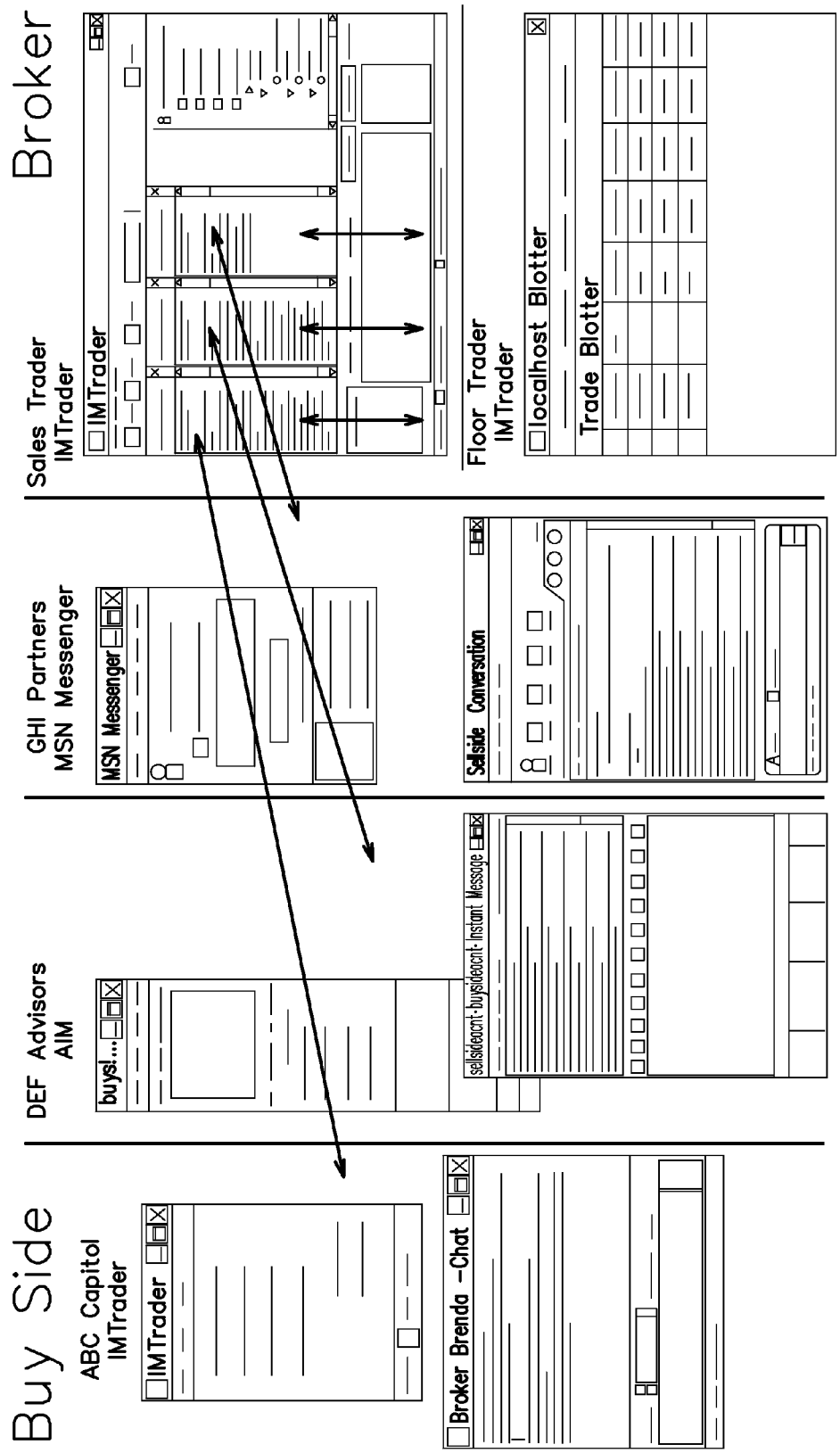
FIG. 7 is an image of an exemplary IM chat windows and a specially configured IM client software window.

In an alternative embodiment, the buy-side trader's client device 44 is configured with specially configured IM client software (e.g., IMTrader™ software distributed by the assignee hereof) that provides a customized user interface whereby the trader may input trading instruction parameters by typing and/or selecting options from specially configured menus and/or providing data via a customized GUI. An image illustrating an exemplary GUI of such specially configured IM client software is shown in FIGS. 7 (labeled IM Trader) and 9. The specially configured IM client software may be further configured to provide additional features, as discussed in greater detail below.

Figure 2A:
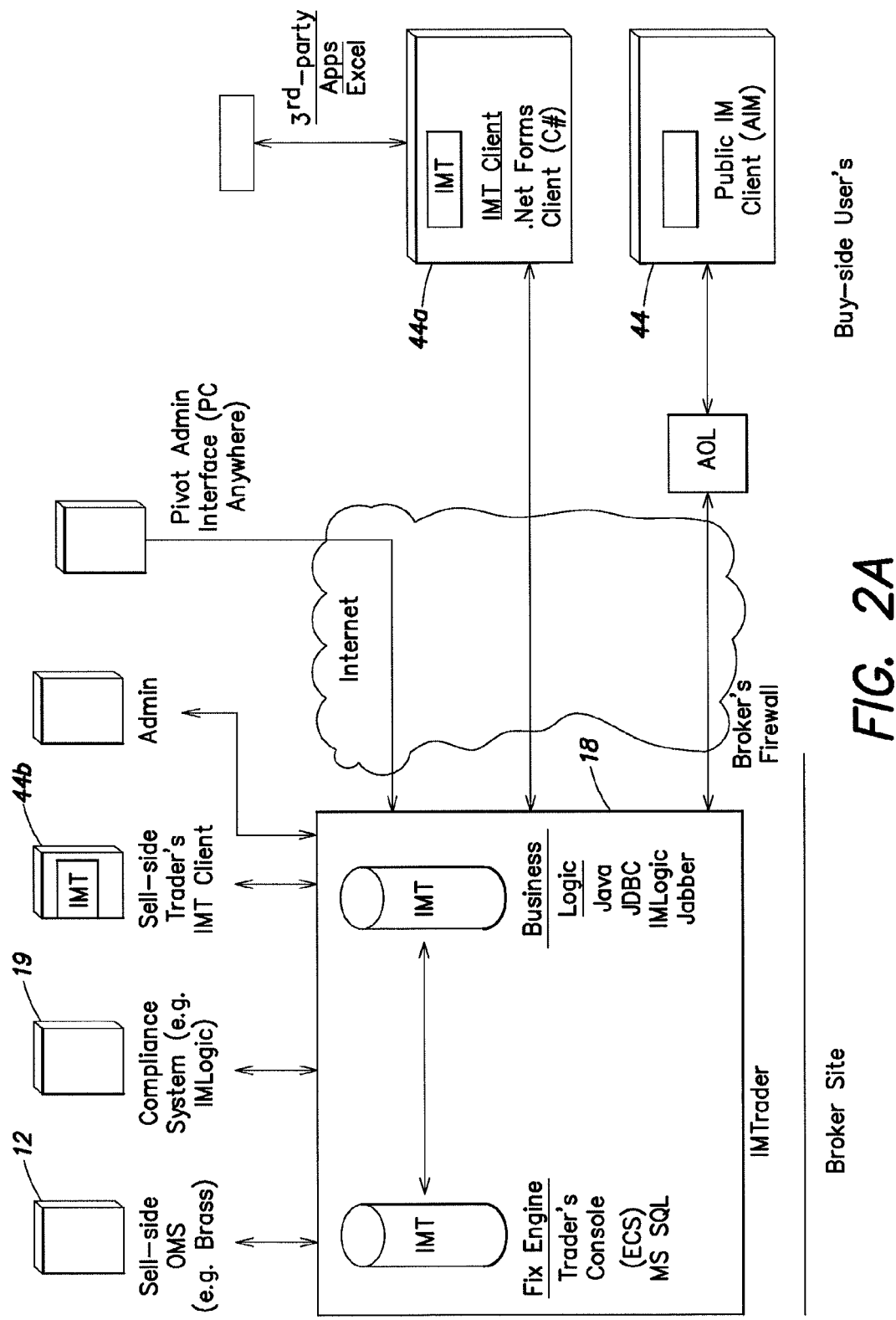
FIGS. 2A and 2B are block diagrams illustrating exemplary network topologies in accordance with the present invention.
Figure 2B:
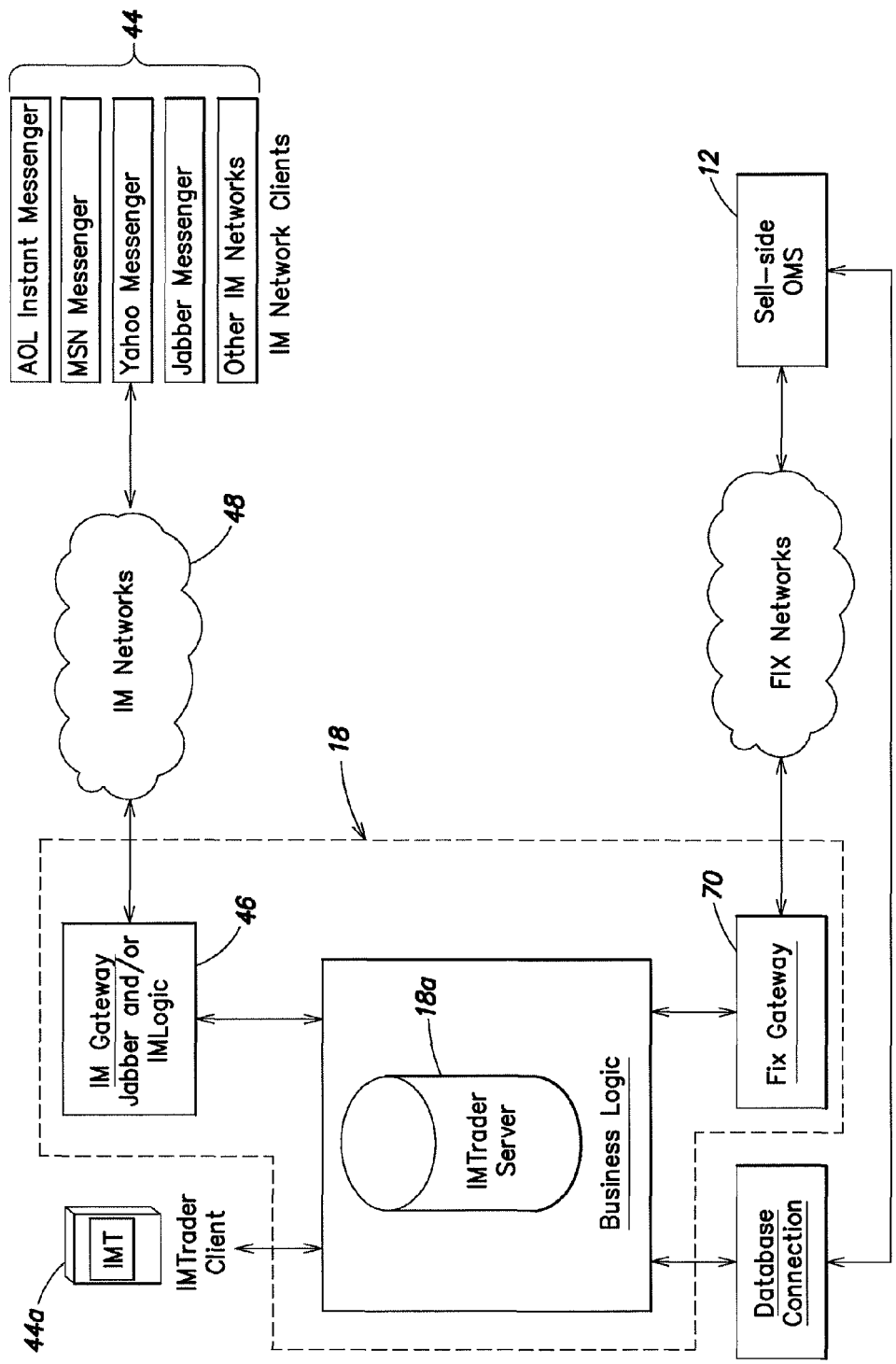

IM communications sent from a buy-side trader 41 are textual in nature, are formatted according to the IM network provider's protocol and are incompatible with the sell-side brokerage's OMS 12. Conceptually, in accordance with the present invention, the Trader Server 18 receives such IM communications and converts them into communications that the sell-side brokerage's OMS can understand, interpret and/or is configured to accept. Accordingly, the Trader Server 18 effectively converts an IM communication to a communication (or responsively creates a new communication) that is compliant with the communications protocol used by the brokerage's OMS 12. In addition to handling of such inbound communications (from an IM client to an OMS), the system is capable of handling outbound communications (from an OMS and/or to an IM client), as discussed below. In the example, herein, the new/converted communications are compliant with the FIX protocol, although conversion/formatting, etc. into any appropriate communication may be performed in accordance herewith. Network topologies in accordance with the present invention is shown in greater detail in FIGS. 2A and 2B, and operation of the Trader Server 18, with respect to the example(s) of FIGS. 2, 2A and 2B, is discussed below with reference to FIG. 3.

Inbound Communications

Figure 3:
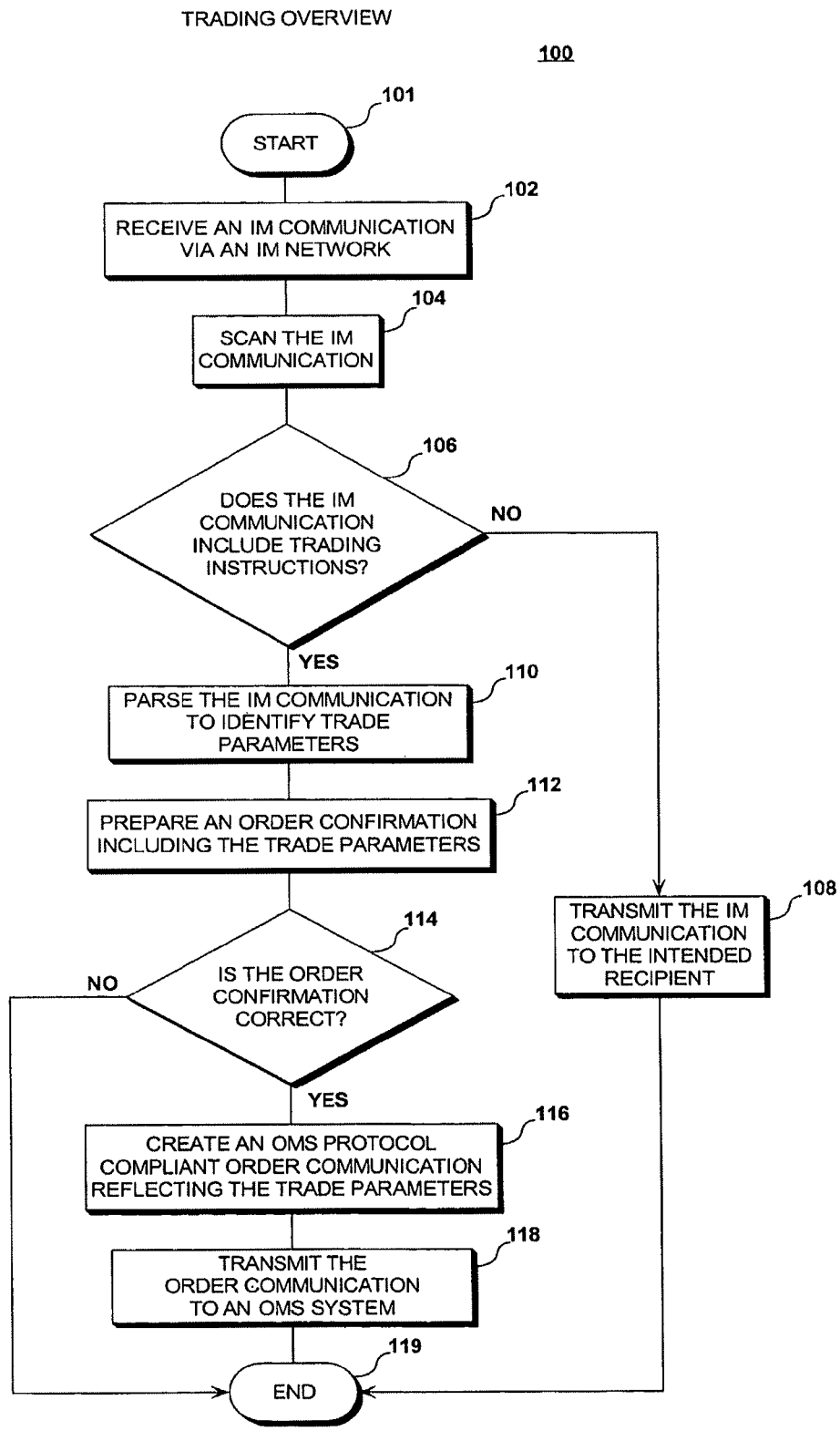
FIG. 3 is a flow diagram illustrating an exemplary method for processing trading instructions received via an instant message communication in accordance with the present invention.

FIG. 3 is a flow diagram 100 illustrating an exemplary method for processing trading instructions received via an IM communication and other inbound communications (from an IM client to an OMS). Referring now to FIGS. 2, 2A, 2B and 3, the method begins with receipt of an IM communication at the Trader Server 18 via a public or private network 48, as shown at steps 101 and 102 of FIG. 3. Transmission and receipt of the IM communication may be performed in a conventional manner. Accordingly, a password-protected login procedure may be required for the buy-side trader to connect and communicate with the Trader Server 18 and/or an OMS.

Figure 5:
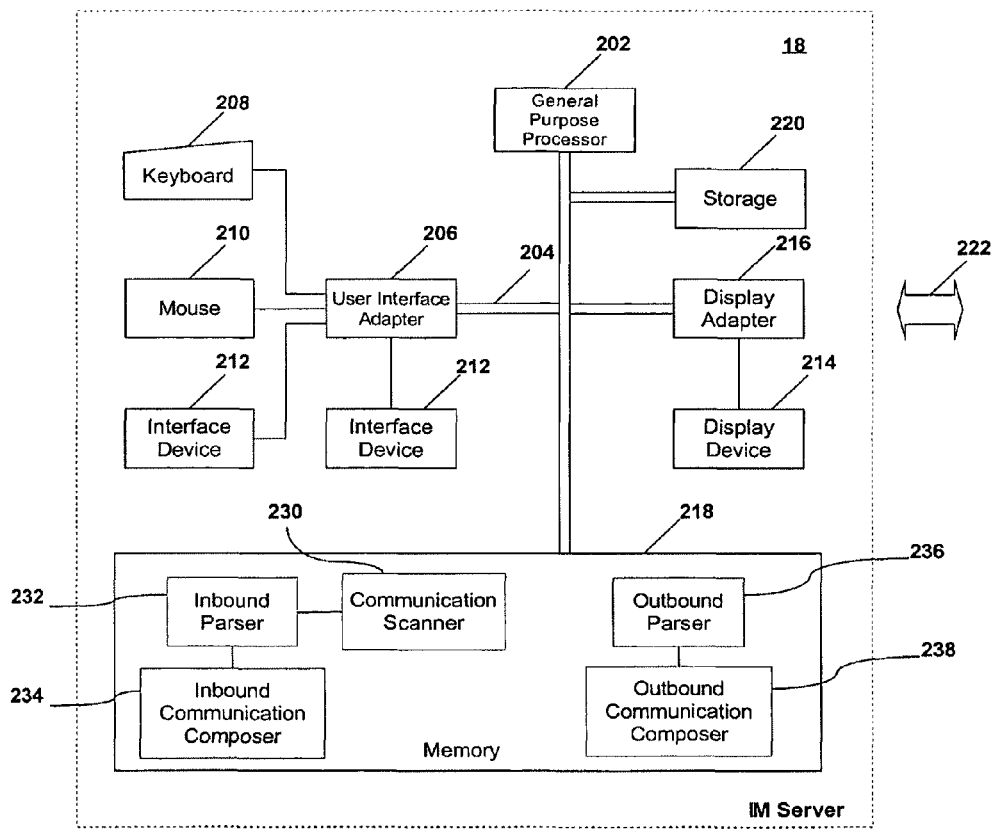
FIG. 5 is a block diagram illustrating an exemplary server for processing instant message communications in accordance with the present invention.

Next, in accordance with the present invention, the Trader Server 18 (FIG. 2) scans the IM communication to determine whether the IM communication includes, or likely includes, trading instructions, as shown at steps 104 and 106 of FIG. 3. The scanning is performed by the Communication Scanner module 230 of the Trader Server 18, as shown in FIG. 5. For example, the Communication Scanner module 230 may examine the sender-supplied text of the message to identify one or more of a predetermined set of keywords, e.g. "buy", "sell", "limit", "edit", "cancel" or other terms, or synonyms/alternatives thereof (e.g. "b" for "buy", "s" for "sell", etc.), typically included in trading instructions, and relating to instructions for a trader and/or to be carried out by an OMS. The keywords may include, e.g. "algo", to provide instructions to initiate an algorithm-based trade, e.g., such as a volume weighted average price (VWAP) or time weighted average price (TWAP) algorithm, such algorithm-based trades being known in the art. By way of example, if any of these terms are found in the IM communication, the Communication Scanner module 230 may conclude that the IM communication includes trading instructions that will be forwarded to an OMS. Any suitable scanning technique may be implemented, as will be understood by those skilled in the art.

If it is determined that the IM communication does not include trading instructions in step 106, then the IM communication is simply transmitted, i.e. allowed to pass, to the intended recipient, as shown at step 118, and no further action is required in connection with the present invention. Optionally, the communication may be logged by the compliance system 19 (FIG. 2) by storing a copy, etc., in compliance with SEC 17*a*-4.

If, however, it is determined in step 106 that the IM communication does include trading instructions (e.g., place, edit, or cancel instructions), then the method continues with parsing of the IM communication to identify trade parameters of the trading instructions, as shown at step 108. This parsing may be carried out by Inbound Processor module 232 of the Trader Server 18 shown in FIG. 5. Any suitable parsing technique may be used as will be appreciated by those skilled in the art. In one embodiment, buy-side traders are permitted to compose free-form, natural language IM communications that include their trading instructions. For example, the substance of the IM communication may be "Bob, I'd like to buy some IBM stock—please buy for me 100 shares at the market price." Any of various known techniques may be used to examine the content of such a natural language IM communication and extract relevant terms believed to be trade parameters. In this example, the parsing may result in interpretation of the IM communication to include trading instructions to buy 100 shares of IBM at the market price.

In an alternative embodiment, buy-side traders are encouraged to compose IM communications for trading purposes that have a predefined cadence, and the Inbound Processor module 232 of the Trader Server 18 (FIG. 5) is configured to expect such a cadence. For example, a prescribed sequence of terms/variables formatted in a certain manner may be required or permitted as a predefined cadence. By way of further example, the prescribed sequence may be:

Side Quantity Ticker Ordertype Limitamt Note.

Accordingly, if an IM communication were received that read "OK, I'd like to buy 10,000 IBM limit 98", the Inbound Processor module 232 of the Trader Server 18 (FIG. 5) would identify the cadence "buy 10,000 IBM limit 98", where SIDE=buy, QUANTITY=10,000 shares, TICKER=IBM, ORDERTYPE=limit, LIMITAMT=$98, and note=[nothing]. More specifically, the cadence may require parsing to identify each trade parameter, namely: a SIDE parameter indicating a side of the transaction, which must be the first term in the cadence, and which must be selected from the list: buy, sell, cover (buy), short; a QUANTITY parameter, which must be numeric, and may include logic to convert abbreviated or confusing quantities (e.g. 10 k, or 10,000 or 10000) into a numerical format expected by an OMS, e.g. 10000; a TICKER parameter, which may be an unrestricted field, an ORDER TYPE parameter, which must be selected from the list mkt/market=mkt, lmt/limit/top/low=lmt; a LIMIT AMOUNT parameter, which must be numeric, and a NOTE parameter, which may be optional. Optionally, additional functionality may be provided to all for editing and canceling of orders, managing sending and/or receipt of notices of execution, etc. Any suitable cadence, or multiple cadences, may be used.

Optionally, if a keyword is found, but values for one or more expected trade parameters are missing, the system may enter a Q&A mode in which individual IM communications are sent by the system that request the sender to enter values for parameters. For example, if the original communication included only "buy", subsequent IM messages may be sent as follows "Enter quantity", "Enter ticker", etc. until values for all required trade parameters have been obtained.

After the trade parameters have been identified from an inbound IM communication (that is, an IM communication being sent to an OMS), the Outbound Communication Composer module 234 of the Trader Server 18 (FIG. 5) creates an order confirmation communication that includes the trade parameters, as shown at step 110. The order confirmation communication may have any suitable format, but is preferably composed as an IM communication directed to the buy-side trader that sent the IM communication including the trading instructions, and that originated from the sell-side trader that received the instructions. The order confirmation preferably includes text asking the recipient to confirm the trade parameters as understood by the Trader Server 18. For example, the order confirmation communication, when displayed via the buy side trader's IM client device, may have the form:

Buy 10000 IBM LMT 98? Respond now with Yes or No.

If it is determined that the order confirmation is not correct (e.g. by receipt via a responsive IM communication including the text "N" or "No"), the method ends, as shown at steps 112 and 119 of FIG. 3. This may be followed by a new IM communication including correct trading instructions, at which point the method would repeat from step 101. It will be appreciated by those skilled in the art that additional functionality may optionally be provided to, for example, ask the user for clarification, e.g., If "no", what is not correct? Please respond with side (s), quantity (q), ticker (t), order type (o), limit amount (l) or cancel further processing (c). In addition, an "expert mode" may be provided in which the server may not ask for a confirmation. These messages are outbound communications, and may be handled by the Outbound Communications Composer module 238, as discussed in detail below.

If however, it is determined that the order confirmation is correct (e.g. by receipt via a responsive IM communication including the text "Y" or "Yes"), then the Inbound Communication Composer module 234 (FIG. 5) of the Trader Server 18 creates an OMS protocol compliant order communication reflecting the trade parameters, as shown at step 114. Additional logic may be employed to handle other responses, or a lack of a timely response. This order communication is comparable to an order communication sent from or to an OMS for processing by another OMS, and may be in any suitable format and/or prepared according to any suitable protocol. The particular protocol used will depend upon the protocol used by the OMS with which it is desired to be compatible.

For example, an order communication compliant with the FIX protocol may be created in step 114, for communication to a FIX-compliant OMS. Accordingly, this requires a mapping of fields in the cadence/IM communication to fields according to the FIX protocol, such that the trade parameters supplied via the IM communication can be presented in the appropriate fields of the FIX protocol order communication, and such that the FIX protocol order communication will be properly understood by the OMS. Advantageously, in this example, a dedicated FIX connection is required only between the sell-side brokerage's OMS 12 and the sell-side brokerage's Trader Server 18, and yet numerous different buy-side traders can communicate with the brokerage's FIX-compliant OMS without the need for such buy-side traders to have a FIX connection, or a FIX-compliant OMS. Instead, a buy-side trader only requires conventional IM communication hardware and/or software, and/or specially configured IM client software.

Consider again the example above, which includes the trading instructions BUY 10000 IBM LIMIT 98. This information, as interpreted by the Trader Server 18, is represented in the table below:

| IM Server Field | Value |
|---|---|
| Side: | BUY |
| Quantity: | 10000 |
| Ticker: | IBM |
| Order Type: | Limit |
| Limit Amount: | 98 |
| Trade Status: | New |
| Filled Amount: | 0 |

This information may then be mapped to the corresponding FIX fields for creating of a corresponding order in accordance with the FIX protocol, as represented in the table below.

| Trader Server Field | Value | FIX field No.: Description |
|---|---|---|
| Side: | BUY | 54: Side |
| Quantity: | 10000 | 38: OrderQty |
| Ticker: | IBM | 55: Symbol |
| Order Type: | Limit | 40: OrdType |
| Limit Amount: | 98 | 44: Price |
| Order Status: | New | 39: OrdStatus |
| Filled Amount: | 0 | 14: CumQty |

As will be appreciated by those skilled in the art, this simple illustrative example may be included as part of a tag=value style FIX message as follows:

8=FIX.4.2^9=251^35=D^49=AFUNDMGR^56= ABROKER^34=521 ^52=2003061509:30:47^11= 123456^1=26522154^55=IBM^48=459200101^22=1^54= 2^60=2003061509:30:47^38=10000^40=2^44=98^10=127

By way of further example, such information may be incorporated as part of a FIXML communication as follows:

```
<FIXML>
<NewOrdSingle ClOrdID="123456"
Side="2"
TransactTm="20030615T09:30:47-05:00"
OrdTyp="2"
Px="98"
Acct="26522154">
<Hdr Snt="20030615T09:30:47-05:00"
PosDup="N"
PosRsnd="N"
SeqNum="521">
<Sndr ID="AFUNDMGR"/>
<Tgt ID="ABROKER"/>
</Hdr>
<Instrmt Sym="IBM"
ID="459200101"
IDSrc="1"/>
<OrdQty Qty="10000"/>
</NewOrdSingle>
</FIXML>
```

Creating an order communication that is properly formatted, carries the corresponding trade parameters in the appropriate fields, and is otherwise FIX protocol compliant is straightforward, as will be appreciated by those skilled in the art. A more detailed description of the FIX protocol is provided on the fixprotocol.org website.

Figure 6:
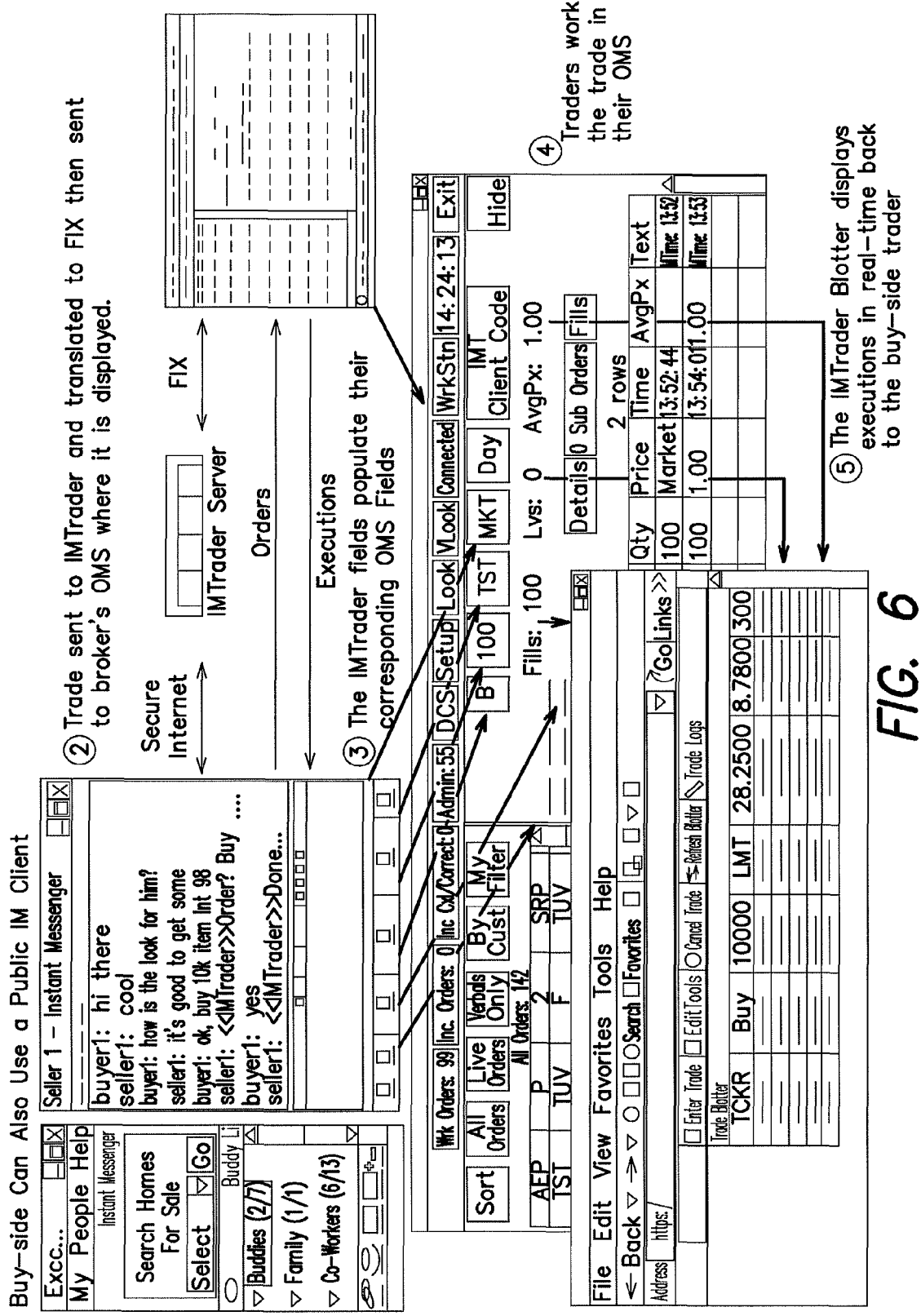
FIG. 6 illustrates exemplary IM chat windows, a trade blotter, and an OMS graphical user interface.

The order communication is then transmitted from the Trader Server 18 to the brokerage's OMS system 12 (FIG. 2), as shown at step 116 of FIG. 3. In other words, the Trader Server 18 inserts a new FIX message into the OMS database. Additionally, the IM message is transmitted to the intended recipient (sell-side broker) and is displayed on the sell-side broker's display screen, as shown at steps 118 and 119. A third-party FIX engine of the OMS monitors the message queue in the database and performs the required actions as dictated in the FIX message. Transmission of the FIX-compliant, or other, communication may be performed in a straightforward manner, as will be appreciated by those skilled in the art. The sell-side broker receives the buy-side trader's IM and thus is kept informed of the transaction. Optionally, an authentication step is included in which it is confirmed that the sender of the trading instructions has been given permission to trade over IM via the sell-side firm's server/system. For example, meta information related to the buy side trader may include identification of which firm that IM buddy belongs to so the order can be placed properly in the OMS. Further confirmatory or other information may be included, such as a date and time of a trade. FIG. 6 illustrates exemplary IM chat windows 140, 142, a trade blotter 150, and an OMS GUI window 160, and shows the relationship of exemplary data exchanged between same.

After the order communication is received by the OMS, processing of the trade continues in a conventional manner. For example, this may include the OMS's acceptance and/or acknowledgement of the order communication, display of the corresponding order in via a GUI window of the OMS, the sell-side broker's acceptance of the order in the OMS, etc. As the trader executes one or more trading transactions in fulfillment of the order, one or more Notices of Execution (NoEs) may be sent to the buy-side trader.

Outbound Communications

Figure 4:
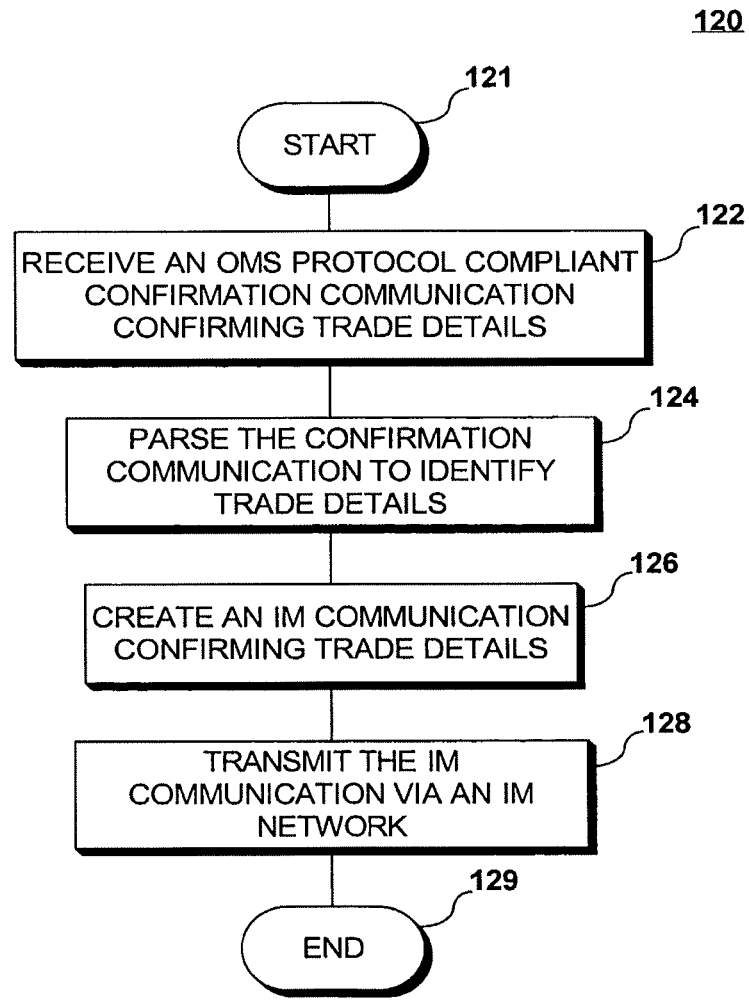
FIG. 4 is a flow diagram illustrating an exemplary method for reporting trading execution via an instant message communication in accordance with the present invention.

In accordance with the present invention, transactions are reported, e.g. via NoEs, to the buy-side trader via an IM outbound communication (that is, from an OMS and/or to an IM client). FIG. 4 is a flow diagram 120 illustrating an exemplary method for reporting trading execution (or other communications outbound from an OMS) via an IM communication. Similarly to the inbound communications (from an IM client to an OMS) processed above, these outbound communications (from an OMS to an IM client) are processed in an automated fashion and delivered electronically from the sell-side brokerage's OMS 12 through the Trader Server 18 directly to the buy-side trader's client device 44, without the need for human intervention. As shown in FIG. 4, the method starts with receipt from the OMS 12 (FIG. 2) of an OMS protocol compliant, e.g. FIX compliant, verification communication containing trade details (e.g., an NoE) at the Trader Server 18 (FIG. 2), as shown at steps 121 and 122 of FIG. 4. This communication may be prepared and sent by an OMS in a conventional manner, as will be understood by those skilled in the art. This communication is placed in a queue that is monitored by the Trader Server 18. For example, when a fill is entered for a particular order, a FIX verification communication is received at the Trader Server 18 from the broker's OMS 12. The FIX communication is placed in the incoming message queue, which is monitored by Trader Server.

Next, the Outbound Processor module 236 of the Trader Server 18 (FIG. 5) parses the verification communication originating from the OMS, which in this example is FIX compliant, to identify the pertinent trade details, as shown at step 124. In the example above, such parsing may identify that the buy order for 10,000 shares of IBM at a limit of $98 has been filled. It is noted that the trade details may not be identical to the trade parameters. For example, the trade details may indicate that so far, only 6,000 shares of IBM have been purchased at $98/share. In addition to the execution quantity (e.g. 6,000), the trade details may therefore further indicate the remaining quantity to be filled (e.g. 4,000), an order identification number, average share price, and/or other pertinent transaction details.

The Outbound Communication Composer module 238 of the Trader Server 18 (FIG. 5) next creates an IM communication including the trade details, as shown at step 126. This may be performed by the server creating a message that is sent to the IM Gateway's API software in a straightforward manner, as will be understood by those skilled in the art. The IM communication is then transmitted to the buy-side trader 41 via an IM network 48 (FIG. 2) in a conventional manner and the method ends, as shown at steps 128 and 129 of FIG. 4. In the context of the example above, the textual content of the IM communication may read "Update for Buy 10,000 IBM LMT 98: filled 6,000 @ 98, 4,000 leaves". This IM communication containing trade details is delivered to and viewable by the buy-side trader 41 via his client device 44 (FIG. 2) from the sell-side broker, and it is also viewed on his client device. Accordingly, both parties in the conversation see the message; though it is sent from the sell-side Trader Server, it echoes back and is viewable on the sell-side broker's display screen.

Trader Server

FIG. 5 is a block diagram of a Trader Server 18 (see FIG. 1) in accordance with the present invention. The Trader Server 18, which includes conventional server hardware storing and executing specially configured computer software for carrying out a method in accordance with the present invention. By way of example, the Trader Server 18 may be implemented as a specially configured server, which may optionally include the FIX Gateway and/or the IM Gateway. By way of example, conventional server hardware including an Intel Xeon 2.8 GHz processor with a 512 k cache and running Red Hat Enterprise Linux ES Basic Edition or any typical Microsoft Windows server software (2000, 2003, etc.), having 1 GB RAM and 36 GB of hard disk memory, a dual port network adapter, floppy disk drive and CD-ROM drive has been found suitable for this purpose. Further such conventional hardware is configured with the specially configured server software for performing the functionality described above. The server is configured for communication via IM network. By way of example, the server may be configured with a Jabber open source solution, or IM Linkage software manufactured and/or distributed by IMLogic of Waltham, Mass. for this purpose. Further, the server includes software that connects the system to a FIX network. There are numerous applications that will allow an OMS to connect to and communicate via a FIX/FIXML network. The server software may be written in Java or other programming languages to provide the messaging, storing and processing of the messages between the public IM and FIX networks.

Accordingly, the Trader Server 18 of FIG. 5 includes a general purpose microprocessor (CPU) 202 and a bus 204 employed to connect and enable communication between the microprocessor 202 and the components of the Trader Server 18 in accordance with known techniques. The Trader Server 18 typically includes a user interface adapter 206, which connects the microprocessor 202 via the bus 204 to one or more interface devices, such as a keyboard 208, mouse 210, and/or other interface devices 212, which can be any user interface device, such as a touch sensitive screen, digitized entry pad, etc. The bus 204 also connects a display device 214, such as an LCD screen or monitor, to the microprocessor 202 via a display adapter 216. The bus 204 also connects the microprocessor 202 to memory 218 and long-term storage 220 (collectively, "memory") which can include a hard drive, diskette drive, tape drive, etc.

The Trader Server 18 may communicate with other computers or networks of computers, for example via a communications channel, network card or modem 222. The Trader Server 18 may be associated with such other computers in a local area network (LAN) or a wide area network (WAN), and operates as a server in a client/server arrangement with another computer, etc. Such configurations, as well as the appropriate communications hardware and software, are known in the art.

The Trader Server's software is specially configured in accordance with the present invention. Accordingly, as shown in FIG. 5, the Trader Server 18 includes various software-implemented components, including a Communication Scanner module 230 for scanning IM communications received from a buy-side trader to determine whether such communications likely include trading instructions, an Inbound Processor module 232 for parsing an IM communication received from a buy-side trader to identify trade parameters from an IM communication, an Inbound Communication Composer module 234 for creating an OMS protocol compliant communication including the trade parameters and transmitting it to an OMS, an Outbound Processor module 236 for parsing an OMS protocol compliant confirmation communication to identify trade details, and an Outbound Communication Composer module 238 for creating an IM communication including the trade details and transmitting it via a communications network. These components are shown logically in FIG. 5 for illustrative purposes, without regard to any particular embodiment in one or more hardware or software components. The Inbound Processor module 232 may communicate directly with the Outbound Communication Composer module 238 for receiving and sending confirmatory IM communications.

Optionally, the server hardware includes software for connecting to the third-party IM networks, such as Jabber (open source) or IM Linkage software by IMLogic, Inc of Waltham, Mass. Preferably, all IM trading messages are logged in the Trader Server's database to ensure all IM messages can be sent to the compliance server 19.

The Trader Server 18 connects an Instant Messaging network to a FIX network. It does this by listening for events from either network, and taking appropriate actions when an event occurs. For example, one type of event could be the arrival of an IM communication.

Software programming code for carrying out the inventive method is typically stored in memory. Accordingly, the Trader Server 18 stores in its memory microprocessor executable instructions including programs for carrying out the method described above.

Additionally, computer readable media storing computer readable code for carrying out the method steps identified above. The computer readable media stores code for carrying out subprocesses for carrying out the method described above.

A computer program product recorded on a computer readable medium for carrying out the method steps identified above. The computer program product comprises computer readable means for carrying out the method described above.

Specially Configured IM Client Software

As discussed above, the buy-side traders client device 44 may optionally be configured with specially configured IM client software 44a instead of conventional, commercially available IM client software. In addition to permitting a user to send IM communications, such specially configured IM client software may provide the ability to connect to multiple, different IM networks, such as AOL, MSN, etc. and to display corresponding chat windows for each network within a single client window, such that multiple IM communications sessions may be viewed concurrently within a single client software application, as shown in FIG. 7. This is contrary to existing IM client software that provides for conducting and/or viewing chat for only a single communication session. Further, such specially configured IM client software may provide for a broadcasting feature, whereby a single IM message may be selectively delivered to multiple recipients, and/or a quick-reply feature, whereby frequently used responses/instructions/commands are available for quick selection from a menu.

Figure 8:
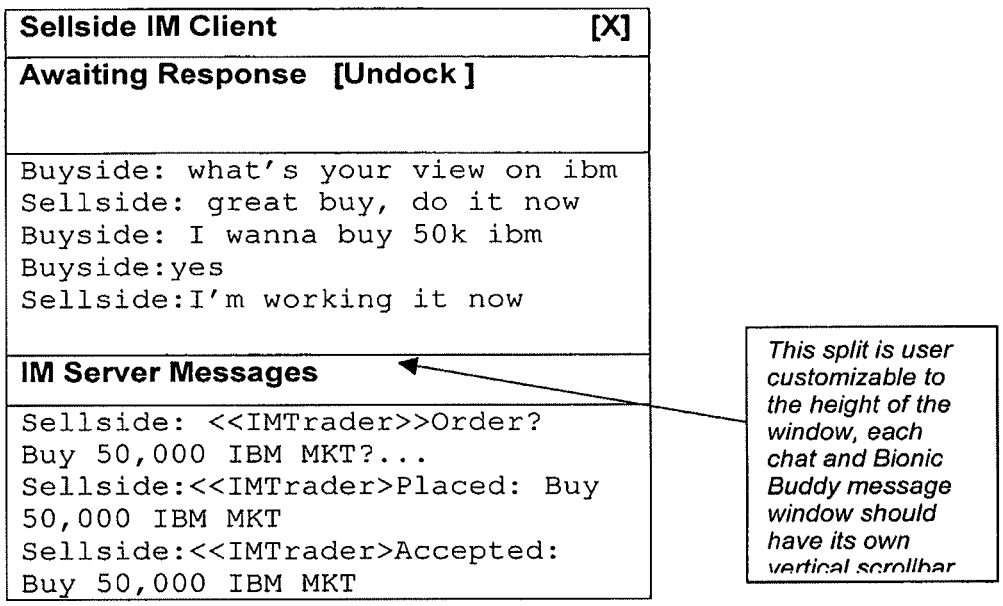
FIG. 8 illustrates an exemplary split IM chat window in accordance with specially configured IM client software.

Further, such specially configured IM client software may be configured to provide a split chat window whereby IM communications between the sell-side broker and others, e.g. the buy-side trader, are viewed in a window that is separate from IM communications sent or received in an automated fashion to or from the sell-side broker's Trader Server, as shown in FIG. 8.

Exemplary System Operation

By way of further example, operation of the system is described as follows with reference to FIGS. 2A and 2B. The Trader Server 18 running trader server software 18a in accordance with the present invention interacts with the trader client 44a, the IM Gateway 46 and the FIX Gateway 70, as best shown in FIGS. 2A and 2B. The IM Gateway 70 incorporates commercially available software, such as Jabber or IM Linkage from IMlogic, among others. The FIX Gateway 70 sends a message out to the FIX networks. The FIX Gateway 70 uses the FIX protocol, which is well known to those in the art. The Trader Server described herein interfaces with the FIX server so that industry standard protocol messages can be sent over various third party FIX networks. When the IM Gateway 70 is started, a call-back function is established back to the Trader Server. This allows the IM Gateway 70 to contact the Trader Server 18 whenever an event occurs. For example, when the IM Gateway 70 server receives a message from one of the Public IM networks, it "calls-back" to the Trader Server 18 that an event has occurred and passes along the received message. The call-back function passes the message along to the Communication Scanner 230, FIG. 5.

The Communication Scanner 230 reviews the contents of the message against the known sets of predetermined trading keywords and cadences. If the Communication Scanner 230 recognizes a keyword or cadence in the message, the message is sent to the Inbound Processor 232, FIG. 5, for parsing. In this exemplary embodiment, the Inbound Processor 232 removes any extraneous information from the message that is not needed for parsing the instant message into a trading message, and assigns a unique message identifier to each message for internal tracking purposes.

The Inbound Processor 232 then determines what actions to take as a function of the keywords found within the message. For example, if the message includes "buy", "sell", "short", "cover", etc., then a new trade instruction will be created. If the message includes "edit" or "cancel", an edit trade or cancel trade instructions will be created, respectively. Further, if the message includes "place", a place/acknowledge instruction will be created. As described above, the Inbound Processor 232 may be configured to operate on synonyms, abbreviations, etc. of keywords in its processing.

Based on the keyword found, the Inbound Processor 232 compares known cadences to the message body. The Inbound Processor parses the message into various data tokens, which are clusters of data, typically taken to be any data between consecutive "space" characters. However, the Inbound Processor 232 is also capable of breaking a message into tokens without spaces. The data type for each token is determined, such as whether the token is of text or numeric type. Based on the keyword, the Inbound Processor 232 begins to determine which of the tokens are applicable for the current cadence set. For example, if the cadence is "side quantity ticker order_type limit_amount" with an associated data type of "text" "numeric" "text" "text" "numeric" for the tokens associated with the cadence, that will assist the Inbound Processor 232 in matching the list of known cadences to the data. Once the Inbound Processor 232 is able to match a message to a known cadence, the message's tokens are mapped to the corresponding FIX Gateway's message format using the Inbound Communication Composer 234.

The FIX Gateway 70 of FIG. 2B includes commercially available software enabling connection to a network to another system so that the Inbound Communication Composer 234 attaches to the FIX Gateway 70. The FIX Gateway 70 is interposed between the Trader Server 18 and a FIX network, to which is connected an OMS 12. In an alternative configuration, the Inbound Communication Composer 234 is directly connected to an OMS using a database connection such as ODBC. This alternative configuration may be used with OMSs that permit direct database connectivity with outside systems. The Inbound Communication Composer 234 composes a message that is appropriate for the system being interfaced, depending upon the Trader Server's configuration and connections. The Inbound Communication Composer 234 calls the FIX Gateway's API or database connection to send the message to the FIX Gateway or database. The Inbound Communication Composer's message is preferably normalized, so that the same message is created regardless of whether the message originated from an Order Entry Ticket or an IM message.

For example, a message for a new trade to buy 50,000 shares of IBM at the market, whether it originated from trader client's new order entry or an instant message, will look virtually identical when the message is passed from the Inbound Communication Composer 234 to the FIX Gateway (or directly to the OMS through a database connection). This message may be input via an exemplary proprietary trader client 44a that allows for sending of IM messages to the Trader Server 18. An exemplary proprietary trader client's order entry screen 85 is displayed in FIG. 9 and is discussed in greater detail below. Alternatively, the message may be initiated via a conventional IM message that includes the text, e.g. "buy 100 tst mkt "note: please work ASAP". Regardless of the method of input, the message from the Inbound Communication Composer 234 will be similar when it interfaces with external systems. In one embodiment, the message is sent to the Trader Server using an XML-formatted message over a secure SSL socket connection. Alternatively, submission via a web service may be used instead of the secure socket connection.

By way of further example, after authorized users have been established for use of the Trader Server, an exemplary communication session between an IM Gateway and a FIX Gateway transpires as follows. First, a user (User 1) attaches to the IM Network, such as AOL's Instant Messenger, using the IM Network Providers' software, such as the AOL Instant Messenger (AIM) client software. Next, another user (User 2) attaches to IM Network via the trader client software by connecting to the Trader Server, which is connected to the IM Client's network (the AOL Instant Messenger network) through the IM Gateway Server. User 1 and 2 are connected to the IM Network until they disconnect or log out. User 1 then enters a message in IM client to User 2, for example "I want to sell 40 k MOT mkt". The message then travels through IM client's network (such as the AOL Instant Messenger network). The public IM Network sends a message to User 2 via the IM Gateway. The IM Gateway receives this message and uses a call-back function to send the message to the Trader Server's Communication Scanner. The Communication Scanner searches all incoming messages for keywords and finds the keyword "sell." Because a keyword was found, the message is sent to the server's Inbound Processor. The Inbound Processor normalizes any keywords such as "k" or "000" to "000", as in 1 k to 1000, as well as synonyms such as "b" for "buy". The Inbound Processor finds the keyword(s) and breaks message into tokens surrounding the keyword(s). The tokens are assigned data types (such as text or numeric), and the Inbound Processor applies cadence rules to token set(s). The Inbound Processor next matches public IM Buddy ID in the Trader Server to get other information about that Buddy ID such as their firm and permission settings. If the Buddy ID is provisioned and permissioned to trade, the process continues. The Trader Server associates the IM Buddy Name with the name of an actual trader, the name of their associated firm and any codes associated with the firm. The Trader Server is aware of the broker's firm name and associated code. Next, the Inbound Processor matches the token set to FIX fields, and sends a message to the Outbound Communications Composer. The Outbound Communications Composer creates a message compatible with the FIX Gateway, and calls the FIX Gateway's API to send the FIX message to the FIX Network. Finally, the original IM message sent by User 1 is displayed in User 2's trader client software. Users can cancel and edit orders in a similar manner.

In certain embodiments, the Communication Scanner module 230 examines the sender-supplied text of the message to identify one or more of a predetermined set of keywords that are instructions of an additional type, namely, a type that will not likely be forwarded to or carried out by the OMS. Instead, the Trader Server, or another system component other than the OMS, acts upon these instructions. The Inbound Processor 232 determines what actions to take as a function of the keywords found within the message. By way of example, these keywords may include "blotter", "research", or synonyms/alternatives thereof. An IM message including these keywords may be parsed in a manner similar to that described above to identify related parameters, etc. However, the Trader Server, e.g. via the Inbound Processor 232 discussed below, initiates a response to these commands without a need to send instructions to an OMS.

For example, if the message includes the word "blotter", the appropriate blotter actions will be taken. By way of example, a database may be maintained at the Trader Server to keep a record of all trading instructions, confirmatory messages, notices of execution, etc., and receipt of the blotter command will result in the Trader Server's referencing of that database, compiling of the requested blotter information, and transmitting of a message, e.g. IM message, back to the party sending the blotter request. More specifically, the system may be configured to display a user's trade blotter (identifying the list of trades, number of shares placed/filled, average price paid per share, etc.) when the keyword "blotter" is included in the message, e.g. "what's my blotter". In this embodiment, this results in a reply to the message with a blotter. This system operates in a manner similar to that described above, but once the Inbound Processor finds the "blotter" keyword, the system looks to its internal database for orders. The internal database is kept in sync with the FIX message in accordance with the present invention. The internal database is read, and the appropriate data from the database is selected. Accordingly, it is not necessary to send information to the OMS to respond to this command. This data is then transformed into a text string which is sent to the IM Gateway via the IM Gateway's API. The outbound message sent to the user over IM may include the order number, side, quantity filled, average price, and number of leaves (quantity ordered−quantity filled). Exemplary output is shown below "Here's is your Blotter (3 placed, 0 unplaced trades):

1 Buy 25,000 IBM LMT @ 92.25: Filled 20,000 @ 92, 5,000 leaves.

2 Sell 45,000 CSCO MKT: Filled 45,000 @ 22.45, 0 leaves

3 Short 40,000 WMT LMT @ 55.44: Filled 0 @ 0, 40,000 leaves"

By way of further example, if the message includes "research", then an IM or other communication including previously compiled financial research information and/or a URL to a brokerage's research reports for a particular ticker may be send via a responsive IM message when a "research [ticker]" string is sent. Such information may be retrieved, for example, from a database maintained locally at the Trader Server, or elsewhere, without the need to send information to or gather information from an OMS.

In an exemplary embodiment, the FIX Gateway 70 includes Trader's Console software manufactured and/or distributed by Eze Castle Software of Boston, Mass. In this embodiment, data is inserted and/or read from a table in Trader's Console that is continually monitored for changes. When a change is detected, a FIX message is sent out from Trader's Console to the FIX Gateway, such as Coppelia, from Javelin Technologies of New York, N.Y. Accordingly, the IM messages, once translated by the Trader Server 18, are inserted into/read from a table in Trader's Console that is used to interact with the FIX Gateway. Thus, the server accesses the databases within Trader's Console, which in turn interact with the FIX Gateway. Most Order Management Systems (from vendors including Macgregor of Boston, Mass., Charles River Development of Boston, Mass., Bloomberg LP of New York, N.Y., SunGard of Wayne, Pa. and Advent Software of San Francisco, Calif.) include a FIX Gateway component that may be interfaced with in a corresponding manner.

Miscellaneous

Although reference has been made herein for illustrative purposes to implementation and/or use of the present invention by sell-side brokers, it is contemplated herein that the IM Server and/or the concepts of the present invention may be implemented by buy-side traders/investment firms or others. Further, it will be appreciated that the present invention allows a user to negotiate their quantity and limit using IM as a transport mechanism. For example, the user might express an order for 50 k IBM limit 98. The system could match this order with other orders in the broker's book. For example, the broker may have an order for 40 k IBM limit 99. The Trader Server may be configured to provide an automated negotiation between the two parties using IM as the transport to negotiate the price and quantity of the order.

Further, the present invention may be used for Indication of Interest (IOI) support, e.g. with respect to a firm wanting to express interest in taking/leaving a position. Accordingly, the present invention is applicable to indications of interest that are not definite orders. In this context, the Trader Server allows the user to enter an IOI using via the trader client. For example: "I'm a large buyer of IBM today" or "ioi: 50 k IBM to buy".

Further still, the system may be configured with a bot for receiving trading instructions apart from any human brokers, such that buy side traders can communicate IM messages directly to a bot "buddy" on the IM network. By way of example, the sell-side firm may create a "bot" presence on the IM network. A bot is a "buddy" in the IM context that is connected to an IM network, but as computer or process, not a human. When a buy-side trader places trading instructions with a bot, by sending an IM message to the bot, the instructions are sent into the OMS without any manual intervention or human requirement whatsoever. Accordingly, the bot is configured to act as an automated conduit to the OMS, not requiring the use of an actual sell-side broker.

In addition, each trade, as well as previous positions may be associated with a buddy ID using a watchlist. A watchlist can include all stocks a buddy has traded in the past, or is interested in monitoring for future trades. For example, if a buddy performs an IBM trade, IBM can be added to that buddy's watchlist. If another buddy also traded IBM or told their broker they were interested in receiving news about IBM, IBM could also be added to that buddy's watchlist. The system could then collect all tickers across all buddy's watchlists to create a new "virtual buddy" for each unique ticker. In this example, a new virtual buddy called "IBM" could be created that represents all IM buddies that have IBM in their watchlist. The broker could then just select the "IBM" virtual buddy from their buddy list, and when a message is sent to this buddy, the system would determine which individuals are subscribed to that ticker by having that ticker in their watchlist, and send the message to those individuals automatically. This creates an efficient way for the trader to manage which clients are interested in various securities, and send information to these clients quickly. Accordingly, an IM virtual buddy can be used in the IM context as a message distribution list of IM buddies to which a message should be sent.

While the description above provides a discussion of IM client to OMS communication for illustrative purposes, it will be understood by those skilled in the art that the present invention encompasses other communications to and from OMS, via other communication networks, such as the World Wide Web and email. Accordingly, for example, the Trader Server may be configured to allow a buy-side trader to email an order to their sell side broker using an email communication incorporating text that is similar to the cadences discussed with regards to IM (such as buy 30,000 IBM LMT 98). Therefore, just as IM to FIX communications are described in detail above, the Trader Server may be alternatively configured to handle SMTP to FIX, and vice versa, communications in the e-mail context, or HTML to FIX, and vice versa, communications in the Web context. The Trader Server could also be configured to send out end of day email summaries of the buy-side trader's trades, or their entire blotter. These IM, Web and email communications could also be in the form of an attachment, for example, in a format understood by Excel®, a spreadsheet application produced by Microsoft Corporation of Redmond, Wash. that could be created/read by the Trader Server.

Further, it is noted that the illustrative discussion above emphasizes for illustrative purposes an embodiment in which inbound communications are translated from IM to FIX, and that related outbound communications are translated from FIX to IM. However, it will be appreciated that these communications are wholly separate and independent. For example, it should be understood that trading instructions may be sent from a buy side trader by a verbal telephone communication, and yet a corresponding Notice of Execution may be sent from the broker's OMS to the buy side trader in IM, involving a FIX to IM conversion. Furthermore, the trading instructions can be sent to a broker by FIX or IM, and then NOEs could be sent via both FIX and IM back to the buy-side. Accordingly, a buy side trader's IM communication may be converted to FIX, and then be sent not only to the sell-side broker's OMS, but also to the buy side trader's OMS, thereby allowing the buy side trader to track transactions originated by IM communication via the buy side trader's OMS. In one embodiment, a choice of communication channel used for each communication could be based on a "preference engine" that provides a profile for each customer that would "know" the best way to route a message, such that all communications for a given buy side trader are reported via IM, for example.

In a certain embodiment, certain additional functionality is provided in relation to the virtual buddies described above. More specifically, the market data and data from other data bases are integrated when creating virtual buddies. For example, the Trader Server is configured to receive a data feed, e.g. from Bloomberg or Reuters, of the most actively traded stocks on the various exchanges (such as the New York Stock Exchange and/or NASDAQ) and to update Virtual Buddy Groups to reflect such data, such as a group called "NYSE Most Active", "NASDAQ Most Active", etc. In this buddy group, the Trader Server determines which tickers are the most actively traded tickers (using a method supplied by the market data vendor), in that group. Then, the system would match the most active tickers with tickers across various distribution lists. This allows the trader to contact buddies that have the most active tickers in their watchlist in an expedient manner. Accordingly, dynamic distribution lists are created and maintained that have an awareness of the trade blotter as well as other market data.

Additionally, other important market data, such as largest gain/loss in stock price or largest percent gain/loss may be incorporated. Other market data could also include items such as tickers that have earnings conference calls today, tickers that have been upgraded/downgraded or frequently mentioned in news stories.

The virtual buddies could also be sorted using various methods, such as total number of shares owned by clients, tickers traded most recently or other sort terms as appropriate.

Further, it should be noted that the functionality of the Trader Server may be accessed using an API of its own. For example, a developer at the broker could write a program that accesses the Trader Server to obtain a watchlist, send IMs to a watchlist, etc. This API facilitates incorporation of the Trader Server into other software solutions.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting.

We claim:

1. A method for communicating instructions via a communications network, the method comprising a computerized system:

receiving, via a communications network, a plurality of electronic communications, wherein at least one of the plurality of electronic communications comprises a textual body of free-form natural language content;

scanning the textual body of free-form natural language content of the at least one of the plurality of electronic communications to identify at least one of a predefined plurality of keywords, each of said plurality of keywords corresponding to a respective trading order instruction;

parsing the textual body of free-form natural language content of the at least one of the plurality of electronic communications to identify at least one parameter corresponding to the respective trading order instruction;

retrieving from a database, based at least in part, on the at least one of the predefined plurality of keywords and the at least one parameter, information relating to the respective trading order instruction;

preparing, in response to scanning, parsing and retrieving, a responsive electronic communication providing the information retrieved from the database, the information based at least in part on the last one of the predefined plurality of keywords and the at least one parameter of the respective trading order instruction; and transmitting, to a sender of the at least one of the electronic communications via the communications network, the responsive electronic communication including the information retrieved from the database.

2. A system for communicating via a communications network, the system comprising:
- a microprocessor;
- a memory operatively connected to the microprocessor;
- a network interface device operatively connected to the microprocessor for communicating via the communications network; and
- instructions stored in the memory and executable by the microprocessor to carry out the method of:
  - receiving, via a communications network, a plurality of electronic communications, wherein at least one of the plurality of electronic communications comprises a textual body of natural language content related to a securities trading order;
  - scanning the textual body of natural language content of the at least one of the plurality of electronic communications to identify at least one of a predefined plurality of keywords, each of said plurality of keywords corresponding to a respective securities trading order instruction;
  - parsing the textual body of natural language content of the at least one of the plurality of electronic communications to identify at least one parameter corresponding to the respective securities trading order instruction, wherein data for the at least one parameter of the securities trading order is missing;
  - prompting for data entry to supply the at least one parameter corresponding to the respective securities trading order instruction;
  - retrieving from a database, based at least in part, on the at least one of the predefined plurality of keywords and the at least one parameter, information relating to the respective securities trading order instruction;
  - preparing, in response to scanning, parsing and retrieving, a responsive electronic communication providing the information retrieved from the database, the information based at least in part on the last one of the predefined plurality of keywords and the at least one parameter; and
  - transmitting, to a sender of the at least one of the electronic communications via the communications network, the responsive electronic communication including the information retrieved from the database.

3. A computer program product embodied on one or more non-transitory computer-readable media, the computer program product adapted for communicating via a communications network and comprising computer-readable program code that, when executed by a processor, performs a method for communicating instructions via a communications network, the method comprising:
- receiving, via a communications network, a plurality of electronic communications, wherein at least one of the plurality of electronic communications comprises a textual body of natural language content;
- scanning the textual body of natural language content of the at least one of the plurality of electronic communications to identify at least one of a predefined plurality of keywords, each of said plurality of keywords corresponding to a respective instruction;
- parsing the textual body of natural language content of the at least one of the plurality of electronic communications to identify a side parameter corresponding to the respective instruction, wherein the side parameter identifies whether the respective instruction is for a buy side or a sell side;
- retrieving from a database, based at least in part, on the at least one of the predefined plurality of keywords and the side parameter, information relating to the respective instruction;
- preparing, in response to scanning, parsing and retrieving, a responsive electronic communication providing the information retrieved from the database, the information based at least in part on the last one of the predefined plurality of keywords and the side parameter; and
- transmitting, to a sender of the at least one of the electronic communications via the communications network, the responsive electronic communication including the information retrieved from the database.

4. The method of claim 1, wherein said communications network comprises an instant messaging communications network, wherein said electronic communication comprises an instant message (IM) communication, and wherein said responsive electronic communication comprises a responsive IM communication.

5. The method of claim 1, wherein the database comprises information related to securities trading.

6. The method of claim 5, wherein the respective instruction comprises an instruction to provide trade blotter information related to a security and wherein the responsive electronic communication includes trade blotter information related to the security retrieved from the database.

7. The method of claim 5, wherein the respective instruction comprises an instruction to provide research information related to a security and wherein the responsive electronic communication includes research information related to the security retrieved from the database.

8. The method of claim 5, wherein retrieving is performed absent interaction with an Order Management System (OMS).

9. The method of claim 1, further comprising storing, in a memory of the computerized system, said plurality of predefined keywords.

10. The method of claim 1, further comprising transmitting the at least one of the plurality of electronic communications to an intended recipient if the scanning does not identify at least one of the predefined plurality of keywords in the at least one of the plurality of electronic communications.

11. The method of claim 1, wherein said parsing, retrieving, preparing, and transmitting are performed only if the scanning identifies at least one of the predefined plurality of keywords in the communication.

12. The system of claim 2, wherein said communications network comprises an instant messaging communications network, wherein said electronic communication comprises an instant message (IM) communication, and wherein said responsive electronic communication comprises a responsive IM communication.

13. The system of claim 2, wherein the database comprises information related to securities trading.

14. The system of claim 13, wherein the respective instruction comprises an instruction to provide trade blotter information related to a security and wherein the responsive electronic communication includes trade blotter information related to the security retrieved from the database.

15. The system of claim 13, wherein the respective instruction comprises an instruction to provide research information related to a security and wherein the responsive electronic communication includes research information related to the security retrieved from the database.

16. The system of claim 2, wherein retrieving is performed absent interaction with an Order Management System (OMS).

17. The computer program product of claim 3, wherein said communications network comprises an instant messaging communications network, wherein said electronic communication comprises an instant message (IM) communication, and wherein said responsive electronic communication comprises a responsive IM communication.

18. The computer program product of claim 3, wherein the database comprises information related to securities trading.

19. The computer program product of claim 18, wherein the respective instruction comprises at least one of an instruction to provide trade blotter information related to a security and an instruction to provide research information related to a security, and wherein the responsive electronic communication includes at least one of trade blotter information related to the security retrieved from the database and research information related to the security retrieved from the database.

20. The computer program product of claim 3, wherein retrieving is performed absent interaction with an Order Management System (OMS).

* * * * *